(12) United States Patent
Fasth et al.

(10) Patent No.: US 8,159,801 B2
(45) Date of Patent: Apr. 17, 2012

(54) SWITCHED HOT SWAP CONTROLLER

(75) Inventors: Kjell-Arne Fasth, Hindås (SE); Sverker Sander, Billdal (SE); Claes-Göran Sköld, V Frölunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 728 days.

(21) Appl. No.: 12/091,973

(22) PCT Filed: Nov. 15, 2005

(86) PCT No.: PCT/SE2005/001728
§ 371 (c)(1),
(2), (4) Date: Apr. 29, 2008

(87) PCT Pub. No.: WO2007/058569
PCT Pub. Date: May 24, 2007

(65) Prior Publication Data
US 2008/0253051 A1 Oct. 16, 2008

(51) Int. Cl.
*H02H 3/00* (2006.01)
*H03K 4/02* (2006.01)

(52) U.S. Cl. .......... 361/93.8; 361/98; 327/127; 327/538
(58) Field of Classification Search ................ 361/93.9, 361/98; 327/127, 538
See application file for complete search history.

(56) References Cited

U.S. PATENT DOCUMENTS

| | | | |
|---|---|---|---|
| 5,770,928 A * | 6/1998 | Chansky et al. | 315/362 |
| 5,973,419 A | 10/1999 | Kruppa | |
| 6,246,592 B1 * | 6/2001 | Balogh et al. | 363/16 |
| 6,798,269 B2 * | 9/2004 | Moriconi et al. | 327/390 |
| 7,199,643 B2 * | 4/2007 | Nalbant | 327/538 |

* cited by examiner

*Primary Examiner* — Rexford N Barnie
*Assistant Examiner* — Zeev V Kitov
(74) *Attorney, Agent, or Firm* — Roger S. Burleigh

(57) ABSTRACT

The invention describes an electric circuit (100), a method and a computer program for hot-swapping an electronic board in a telecommunication system, where the increase in current in the electric circuit is controlled by a microcontroller (130) switching a power transistor in a switching circuit (150) so as to gradually increase the capacitor voltage for the electronic board. The current level is measured either in the microcontroller (130) itself or in an external current sense circuit (140) and compared to a maximum current level.

1 Claim, 2 Drawing Sheets

SWITCHED HOT SWAP CONTROLLER

TECHNICAL FIELD

The present invention relates to the field of hot swap controller circuits using an external current limiting transistor.

BACKGROUND OF THE INVENTION

For quite a number of years the technology of hot swapping of electric components has been known in the computer and the telecommunication fields.

Hot swapping means adding or removing electric components into an existing computer or telecommunication architecture without having to perform a power shut-down of the whole architecture first.

In the network technology fields, this technology provides the possibility of adding or removing network adapters to or from a backplane, while the backplane is still delivering power to other components in the network. Likewise, hard drive units in a redundant backup system, such as a RAID (Redundant Array of Independent Disks), can be plugged in or taken out from the server machine, while the server is still running.

The hot swap technology is being used in the computer field in order to insert different kinds of adapters onto a motherboard on a computer, while it is still being provided with power or as external devices plugged into USB (Universal Serial Bus)- or FireWire-ports belonging to a computer.

Hot-swapping in telecommunication applications allows for example insertion or removal of line cards to or from a backplane in a base station, while the backplane is still delivering power to other line cards connected to it. Thus system upgrades, maintenance and repair are performed much faster with minimum disturbance to users of the telecommunication network.

One common problem when hot-swapping units into an existing computer- or telecommunications system is the occurrence of large inrush currents, which can exceed the operating current of the power supply and thus damage either the computer- or telecommunication system or the component itself, or both.

The reason for this put simply is that the component to be added to the system often presents a high capacitive load to the power source of the system and large capacitors need time to be loaded. However, during the sudden current surge caused by the switch-on of the power source circuit, the large capacitor acts as a short circuit, thus leading to a large inrush current going through the circuit of the component to be added to the computer- or telecommunication system.

Similar phenomena are observed when such modules are removed from the computer- or telecommunication system.

The first and easiest way of dealing with inrush currents are the use of discrete components in the form of thermistors whose resistance is current dependent and increasing or decreasing with increasing current, so called PCTs and NTCs. Thus, during switch-on procedure of the power supply, a thermistor is warmed up by the current flowing through it and slowly allows the current to rise, when a large capacitive load is added to the power supply circuit. In this way, the initial rapid current rise due to the addition of the capacitive load is slowed down.

A disadvantage of the thermistor solution is its inherent slow response to current transients and might not be desirable in an environment, where modules are frequently inserted or removed from for example a telecommunication system.

Thus, in addition to thermistors, rapid changes have to be responded to by fuses or fault protection devices, where the fuse add a voltage drop to the power path, which is generally not desired in these applications. Also, the thermistors themselves add a voltage drop to the power path.

A different solution still using discrete components is the use of discrete MOSFETS, which provide low drain-to-source resistance Rds(on) and act almost as an ideal switch.

MOSFETs require low voltages to operate and can be switched on or off rapidly in order to respond rapidly to voltage changes.

The disadvantage of discrete MOSFETs for protection against inrush currents is the additional circuitry in the form of resistors and capacitors necessary to control the current rise time and different fault conditions, such as overcurrent.

Normally, such discrete MOSFETs are expensive and difficult to optimize according to the respective applications.

Also, discrete MOSFETs have a parasitic diode connected from the drain to the source, which can lead to current backflow, when the output voltage on the device is higher than the input voltage.

The object of the present invention is to rectify some of the disadvantages with known technology described above.

SUMMARY OF THE INVENTION

The object of the invention is achieved by an electric circuit for hot-swapping of an electronic arrangement, which includes circuitry which provides a current charging a capacitor on the electronic arrangement, a circuitry for controlling the increase in current which charges the capacitor on the electronic arrangement where said electric circuit additionally includes circuitry which switches the current charging the capacitor and a processing unit which controls the timing of the switching of the current in the electric circuit.

In one embodiment of the invention, the circuitry for controlling the increase in current which charges the capacitor on the electronic arrangement is a circuitry adapted for releasing the energy stored during switching of the above current charging the capacitor in the form of another current additionally charging the capacitor. This circuitry may include, for example, an inductor.

The inductor would in effect through the releasing of the current control the voltage charging the capacitor on the electronic circuit board when the discrete transistor is switched from the "ON" to the "OFF" state.

In another embodiment of the invention, the circuitry for switching the current charging the capacitor on the electronic board is a discrete transistor. However, other components for switching the current could be used, such as integrated circuits.

Also, the circuitry for switching the current may include a driving circuit for said discrete transistor in the form of a low-ohmic source for the gate charge of the discrete transistor and a rectifier circuit in the form of a diode circuit. The function of the diode circuit is to "free wheel" or release the current from the energy stored in the inductor described below.

In yet another embodiment of the invention, the rectifier circuit may instead of a diode circuit include a transistor circuit or some other circuitry performing an equivalent function.

In one other embodiment of the invention, the circuitry for controlling the timing of the switching of the current charging the capacitor may include a microprocessor, an ASIC, an FPGA or some other suitable circuit which is either pre-programmed or programmable.

From the scalability and flexibility point of view, the use of a programmable microprocessor to control the timing of the switching of the current is preferable.

Depending on the source voltage a system is delivering to the electronic board and the expected load capacitance of the electronic board, a simple adaptation of the program used in the microprocessor to the changed desired signal levels and switching times is sufficient in order to achieve the hot-swapping function. Thus, in comparison to existing hot-swapping systems, the electric circuit according to the present invention is easy to optimize and to configure. Also since the switching of the discrete transistor is controlled by a microcontroller discrete transistors are not critical components in the system anymore.

The controlled switching of the discrete transistor also introduces the advantage that less power is dissipated when the transistor is turned on and that the dissipation can be optimized by adequate programming of the switching sequence in the microcontroller. As a consequence, transistors with much lower SOA (Safe Operating Area) can be used than previously. This means implicitly that cheaper transistor components can be using for the switching transistor.

In yet another embodiment of the invention, the circuitry for controlling the timing of the switching of the current charging the capacitor above may additionally include circuitry for comparing a signal indicative of the supply voltage to the electric circuit above to a signal indicative of an allowed voltage range for the electric circuit.

Additionally, the electric circuit for controlling the timing of the switching of the current charging the capacitor above may also include circuitry for pulse width modulation of the transistor circuit.

In another embodiment of the present invention, a circuit for monitoring the current in the circuit above could be added in order prevent the occurrence of overcurrent in the electric hot-swap circuit above and to deliver a signal indicative of the current level in the electric hot-swap circuit to the circuitry for controlling the timing of the switching of the current in the electric hot-swap circuit.

In the event of overcurrent being detected by said circuit, the current could then be switched off temporarily by the electric hot-swap circuit receiving a signal indicative of overcurrent.

There are various ways of measuring of the current level in the electric circuit of which a shunt resistor circuit is one non-limiting example.

One way of delivering the monitored signal indicative of the current level in the electric hot-swap circuit the signal is to first amplify it and then to compare it to a reference value indicative of a maximum allowable current level in the circuit in a comparator and thereafter sending it to one of the inputs on the microprocessor circuit. This comparison may be performed in the analogue or in the digital domain.

Naturally, an external circuit for monitoring the current level in the electric hot-swap circuit is not necessary, since the same monitoring and measuring function could be built-in into the microprocessor itself. This would have the additional advantage of saving space on the circuit board for an external current monitoring circuit and thereby production costs.

In another aspect of the present invention, the object of the invention is reached by a method for providing hot-swapping of electronic boards in an electric circuit, where the method comprises the steps of providing a current charging a capacitor on the electronic board, controlling an increase in the current charging the capacitor on the electronic board, switching the current charging the capacitor and finally controlling the timing of the switching for the current in the electric circuit by means of a processing unit.

The switching of the current charging the capacitor on the electronic board can include turning "on" and turning "off" a discrete transistor.

Optionally, the step of switching the current charging the capacitor on the electronic board may include the monitoring the increase in current in the above mentioned electric circuit.

The signal indicative of the current increase could be compared to a certain signal level indicative of the maximum current level in the circuit, which would prevent overcurrent going through the circuit during the insertion procedure of an electronic board.

In yet another aspect of the present invention a computer program controls a method for providing hot-swapping of electronic boards according to the method described earlier, which comprises instruction sets for activating a supply voltage monitoring function in the microcontroller, receiving a signal indicative of the supply voltage in the electric circuit and switching a transistor in an electric circuit in response to the voltage signal.

Optionally, the computer program may include instructions for choosing between two modes for switching of the discrete transistor above: continuous switching, such as pulse-width modulated switching or just one switching cycle for the discrete transistor.

In a further step, an instruction set could be used to perform the comparison between the measured signal indicative of the supply voltage level in the electric circuit on the electronic board and a signal indicative of the allowable supply voltage range in the electric circuit.

In the event of said measured signal falling outside of the allowable voltage range another instruction set may perform a watch dog reset operation to restart the electric circuitry on the electronic board.

As an option, the computer program may include an instruction set for measuring a signal indicative of the current level in the electric circuit and comparing it to a signal indicative of a maximum allowable current level in the circuit. In the event that the measured current level exceeds the maximum current level in the electric circuit another instruction set may perform a shutdown of the whole electronic board meaning cutting the electric circuit off from the power supply.

Alternatively, the instruction set may perform only a temporary shutdown of the electric circuit when a measured signal indicative of the current level has reached a predefined maximum value. After a certain period of time, the instruction set may restart the electric circuit again and wait until the next measured signal indicative of the current level reaches the predefined maximum value and the same sequence would be repeated again.

The different aspects of the invention described above are described when the electric hot-swap circuit is included onto an electronic board. However, the same electric hot-swap circuit could equally be installed into a rack used in a telecommunication system where electronic boards are inserted and removed from the rack.

However, the present electric hot-swap circuit is not only limited to the use in telecommunication systems, but also in other technical areas, where a flexible, cost-effective and easily configurable hot-swap controller solution as provided by the present invention is applicable.

BRIEF DESCRIPTION OF THE DRAWINGS
(OPTIONAL)

The invention will now be explained in more detail by a describing certain embodiment thereof and by referring to the accompanying drawings.

DETAILED DESCRIPTION OF PREFERRED EMBODIMENTS

Figure 1:
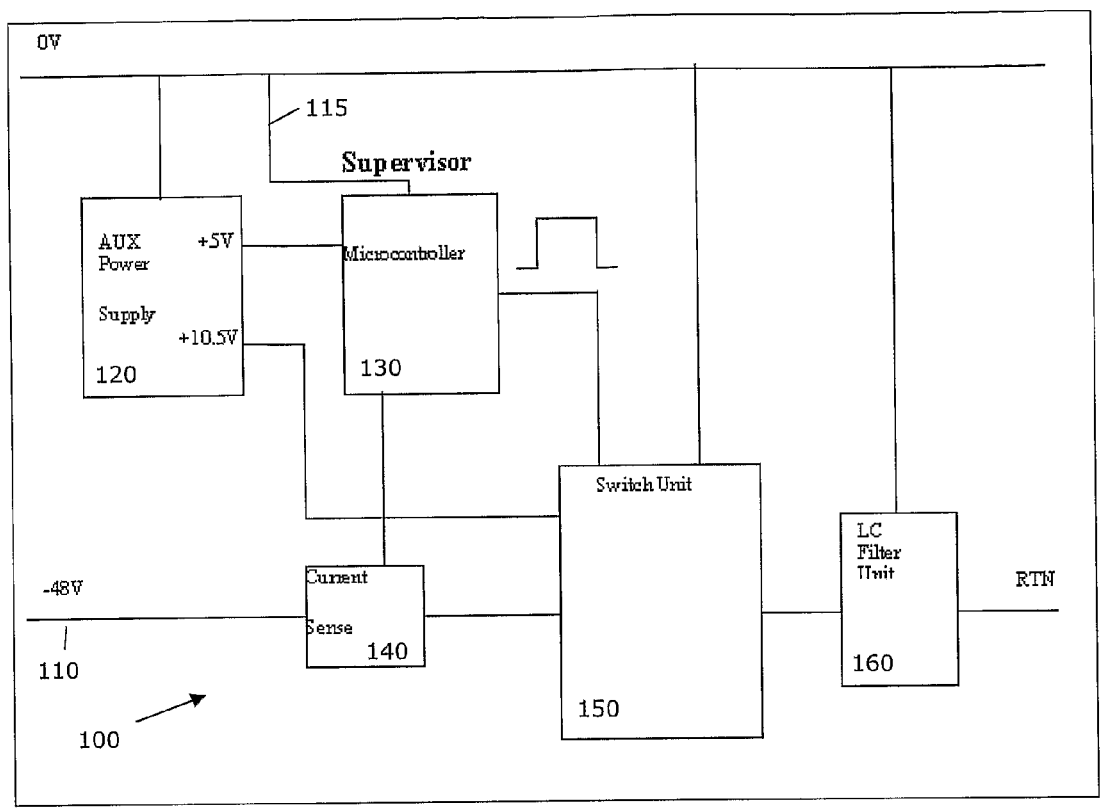
FIG. 1 illustrates one example embodiment of the hot-swap controller according to the present invention.

FIG. 1 shows an example embodiment of a hot-swap circuit according to the present invention. The hot-swap circuit in this example is located in a base station belonging to a mobile communication network. Clearly, the circuit could be located in any other location in a mobile or a data communication network or a server where the need for a hot-swap controller exists.

The example hot-swap circuit 100 in figure is connected to a negative 48V supply 110 and comprises an auxiliary power supply 120, a microcontroller 130, a current sense circuit 140, a switching unit 150 and an LC-filter unit 150.

The reason for a negative voltage supply in telecommunication backplane systems is to minimize the occurrence of corrosion in the presence of current leakage paths, because negative ions tend to corrode metals and the negative ions are repelled by the negative supply voltage.

The hot-swap controller 100 comprises of an auxiliary power supply 120 that converts the incoming –48V source voltage into more appropriate voltages for electronic circuits, e.g. +10.5 V and +5V. The +10.5 V supplies a switching circuit 150, while the +5V supplies a microcontroller 130 supervising the current switching process and a current sense unit 140 measuring the current in the hot-swap circuit 100.

The voltage converter converting the incoming –48 V to +10.5V in the auxiliary power supply 120 can be for example of the type step down converter.

On the other hand, the converter for the +5V uses the power from the +10.5 converter to power the microcontroller 130 and the current sense circuit 140.

In this example, the +5 V, the converter is of the type LDO (low-dropout).

The voltage values in the example embodiment in FIG. 1 are mentioned for practical purposes only and should not be interpreted as limitations. The power supply 120 might in other possible embodiments of the present invention equally convert other source voltages to other auxiliary supply voltages according to need.

The microcontroller 130 in the hot-swap circuit 100 has the function of supervising the switching of the current in the circuit. It reacts upon the signal from the current sense circuit 140 and switches the input power to the switching unit 150 on or off in order to limit the current due to the insertion of a large capacitive load into the circuit.

Also, the microcontroller 130 includes circuitry for measuring the actual level of the supply voltage 110 in the hot-swap circuit 100. The reason for this is that when inserting an electronic board containing the hot-swap circuit 100 into a rack, for example, the supply voltage may at first deviate up to +/–15 V from the –48V supply voltage until it has settled near the nominal –48V after a period of time.

The microcontroller 130 may be for example a microprocessor of the RISC type or any other type of programmable processor. Also the microcontroller 130 could be an ASIC, an FPGA or have some other architecture suitable for the hot-swap application. However, the programmability of the microprocessor ensures the flexibility in choosing the appropriate switching time for the switching on and switching off the current in the circuit by a simple rewriting and reloading operation of the program code stored in the memory of the microprocessor. One should mention however, that the programmability of the microprocessor is not required, since one could equally use a microprocessor with a pre-programmed microcode.

The switching unit 150 according to this example embodiment of the present invention consists of a driver stage, a transistor stage and a rectifier stage. The driver stage is a low-ohmic source for the gate charge of the transistor in the transistor stage. The transistor in the transistor stage is used to switch the input voltage to the LC-filter circuit 160 depending on the signal from the microcontroller 130. In the example embodiment in FIG. 1, the transistor used for switching the input voltage to the LC-filter is a discrete to power transistor. In other applications, where maximum currents in the hot-swap circuit are substantially lower than in telecommunication systems, integrated transistor solutions could be used.

The rectifier stage in the switching unit is used as a discharge path for the inductor in the LC filter circuit 160.

Finally, the LC-filter circuit comprises a capacitor and an inductor circuit. The capacitor is the energy storage to be filled during the switching on phase of the power transistor in the switching unit 150. It basically represents the equivalent capacitance of the electronic board. The function of the inductor circuit is the free-wheeling of the current charging the capacitor.

The circuit in FIG. 1 may be located on an electronic board to be inserted in a rack situated in a telecommunication system, but could equally be placed on the rack receiving electronic boards.

Also, it should be noted that the hot-swap circuit above is not only limited to the use in telecommunication applications, but in any other system where a hot-swap controller is needed or desirable. Thus the inventive hot-swap circuit could be used in those fields where insertion and removal of modules or electronic boards onto a common backplane is frequent and where the switching off of the power feeding the backplane in order to provide for insertion and removal of electronic boards in general is not desirable.

Now, an example embodiment of the method for providing hot-swapping of electronic boards in an electric circuit will be explained with reference to FIG. 1.

When an electronic board comprising the hot-swap circuit 100 from FIG. 1 is inserted into a rack the electronic board is supplied by a current charging the capacitance of the electronic board (the equivalent capacitance in the LC-filter circuit 160).

Since this charging current normally is a rapidly increasing current reaching values in the tens of amperes range in a telecommunication environment, its rapid increase is controlled by the power transistor in the switching circuit 150, where the power transistor dissipates power in the form of heat resulting from the current passing through it. However, in order to limit the amount of heat dissipated by the power transistor of the switching circuit the increase in the current charging the capacitor on the electronic board is controlled by a microcontroller 130 which switches the power transistor according to a method implemented for example as a software program operating inside the microcontroller 130. By using, for example, pulse width modulation for switching the power transistor in the switching circuit 150, the current charging the capacitor on the electronic board is stepped up slowly thus preventing the building up of an inrush current which could potentially either damage the electronic board or lead to malfunction of other electronic boards mounted in a rack in telecommunication systems due to the initial high current drain following the insertion of the electronic board.

It should be mentioned that the current level in the circuit could be continuously monitored via measurement of a signal, e.g. a voltage, indicative of the current level in the hot-swap circuit 100 and compared to a signal indicative of the maximum allowable current level. This function is performed by either an external current sense circuit 140 or in the microcontroller 130 itself. Also, the comparison between the measured signal and the signal indicative of the maximum allowable current in the circuit could be performed in the analog domain or in the digital domain. In the analogue domain, the comparison may be performed by means of, for example a comparator, where the comparator produces an analog output signal indicative of the difference between the two signals on each of its inputs. This difference signal may then be converted into a digital signal either at the output of the comparator or at the input of the microcontroller 130. In the digital domain the comparison may be performed as a logical comparison operation where the measured signal is first converted into its digital representation and then logically compared to another digital signal indicative of the maximum allowable current in the electric hot-swap circuit. This could also be performed either by an external circuit or inside the microcontroller 130.

Also, the rising current resulting from when the electronic circuit board is inserted into the rack of the telecommunication system is controlled by an inductor included in the LC.-filter circuit 160 during the time the power transistor in the switching circuit 150 is in the "ON" state.

When the power transistor is then set into the "OFF" state by the microcontroller 130 due to a high current level in the hot-swap circuit being detected, the inductor "discharges" the stored energy via a slowly rising current and charges the capacitor on the electronic board.

Next, method steps implemented in the microcontroller 130 in FIG. 1 will be described with reference to FIG. 2.

At step 200 the microcontroller is powered on by the action of for example inserting an electronic board into a rack in a telecommunications system (not shown). At the same the microcontroller is reset.

At 210 the initialization of the microcontroller is performed so that the microcontroller starts its operation with correct initial values on its input.

Steps 200 and 210 are basically standard in any power on and initialization procedure for a microcontroller.

Next, at step 220, the setting of the current sense function in the microcontroller to on is performed which amounts to being prepared to receive a signal on one of the terminals of the microcontroller where the signal is indicative of the current level in the hot-swap circuit. The signal indicative of the current level may be a voltage signal delivered by the current sense circuitry 140 in FIG. 1.

Optionally at step 221 a check of the current level in the hot-swap circuit may be performed via a measured signal indicative of the current level where after it is compared to another signal indicative of the maximum allowable current level in the hot-swap circuit.

If this is the case, a shut down the power supply to the electronic board at 222 is performed. In this case, the electronic board has to be re-inserted again to restart the hot-swap process and to supply it with the voltage needed.

Furthermore, at step 230, a signal indicative of the supply voltage signal 115 is compared to a signal indicative of the allowed supply voltage signal range in the hot-swap circuit.

The reason for this comparison is that the supply voltage to the electronic board immediately after the insertion of the board into the rack may vary for a time period around the nominal −48V supplied by the rack. Thus, the instruction set at step 230 should allow for a slight variation of the supply voltage around the nominal value for example by +/−15V.

The comparison operation above may be performed as a comparison in the analog- or the digital domain and may be performed by an external circuit or inside the microcontroller 130.

If the signal indicative of the supply voltage signal 115 is outside the allowed voltage range, a watch dog/reset function is performed at step 240, for temporarily switching off the power transistor in the switching unit 150. The initialization step at 220 and the setting of the current sense function at 230 then are performed again.

In the case that the voltage level of the measured signal indicates a level within the allowed voltage range, a selection is made at 250 to either switch the power transistor in the switching circuit 150 in FIG. 1 in a continuous mode or perform a one time switching on function only for the power transistor in the switching circuit 150.

Figure 2:
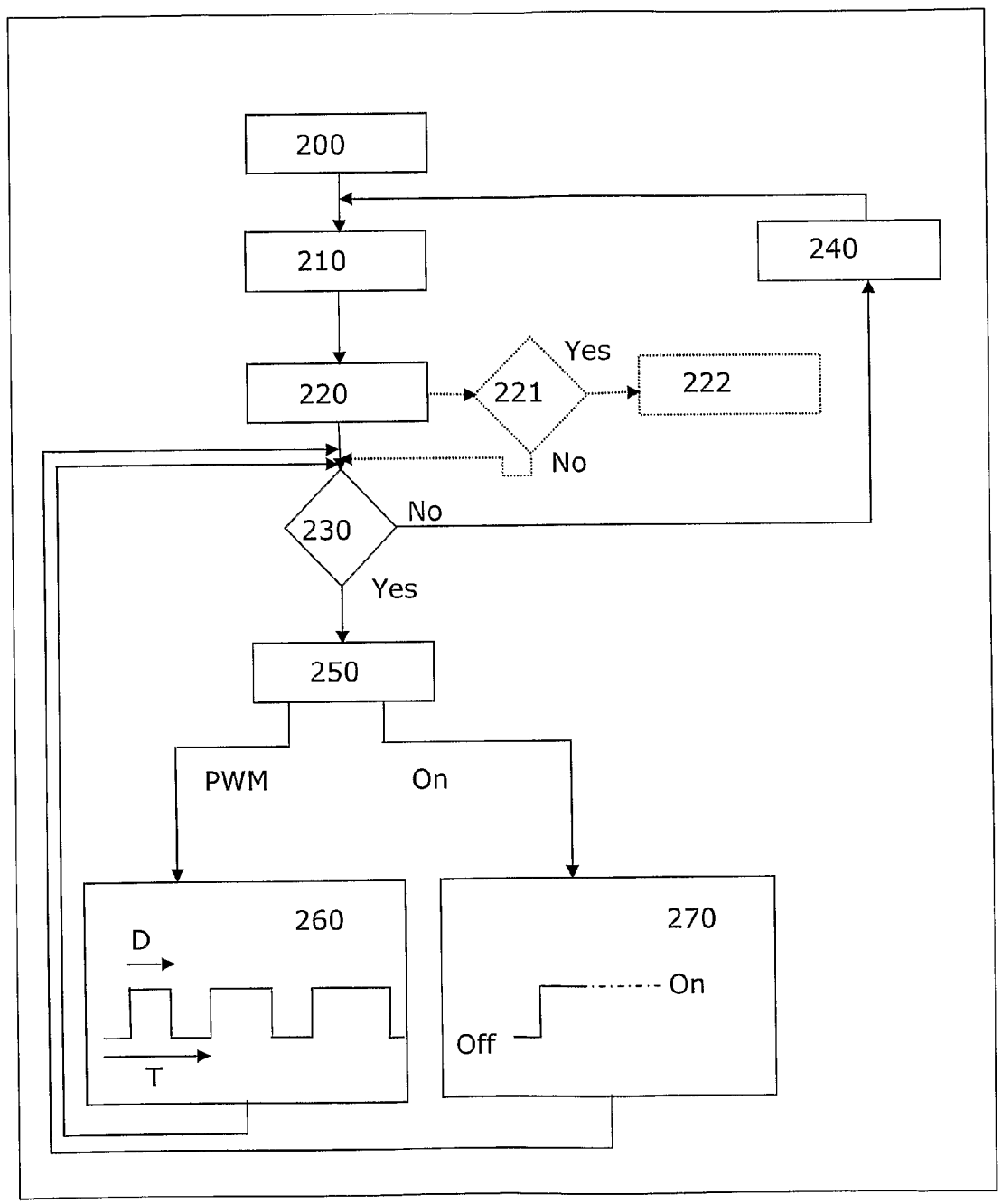
FIG. 2 illustrates the function of the microcontroller in the hot-swap circuit in flowchart form.

In the example in FIG. 2, the continuous switching function is a pulse width switching function, but could of course be any other function depending on the application, the maximum current levels in the hot-swap circuit to be expected and other factors.

Finally, the microcontroller performs switching according to a pulse width modulation scheme at step 260 controlling the power transistor in the switching circuit 150 in FIG. 1. The pulse width D and the period of a pulse T may thus be easily adapted. This is a significant advantage over existing solutions where one part of the hot-swap circuitry has to be replaced.

Alternatively, at step 260, a one time switching operation of the power transistor is provided.

A third variant (not shown) at step 250 would be the selection of a mode for continuous switching of the power transistor, where the current level in the hot-swap circuit is measured for the duration of each pulse. This would in practice entail turning the power transistor "on" by a voltage step, choosing to let the current in the hot-swap circuit reach a maximum allowed level as defined above and at the moment when the maximum value is reached, switch the power transistor "OFF" for a time period and switch it "ON" again, wait until the current rises to a maximum allowed level again, again switch the power transistor "OFF" for a time period and switch it back "ON" and so forth.

The invention claimed is:

1. An electric circuit for minimizing in-rush current when hot-swapping an electronic board, wherein said electronic board comprises a circuit characterized by a series inductance and parallel capacitance, said series inductance limiting the rate of increase in input current to said circuit, said electric circuit for minimizing in-rush current comprising:
   a switch intermediate to an input voltage terminal and said circuit, said switch having a control terminal for selectively controlling said switch between a conducting state and a non-conducting state;
   a current sense circuit intermediate to said input voltage terminal and said switch; and,
   a processing unit coupled to said current sense circuit and said control terminal of said switch, said processing unit selectively controlling said switch between said conducting state and said non-conducting state in response to current flowing through said current sense circuit, wherein a duration of said conducting state is gradually increased as current charges said parallel capacitance of said circuit.

* * * * *